United States Patent
Nakamura et al.

(10) Patent No.: US 6,309,692 B1
(45) Date of Patent: Oct. 30, 2001

(54) METHOD OF AND APPARATUS FOR COATING A SUBSTRATE WITH A COATING MATERIAL HAVING AN EVEN THICKNESS

(75) Inventors: Masahiro Nakamura, Kashiba; Takuya Yokoyama, Takatsuki; Tsutomu Nishio, Kashiwara, all of (JP)

(73) Assignee: Chugai RO Co., Ltd., Osaka (JP)

( * ) Notice: Subject to any disclaimer, the term of this patent is extended or adjusted under 35 U.S.C. 154(b) by 0 days.

(21) Appl. No.: 09/101,989

(22) PCT Filed: Sep. 6, 1996

(86) PCT No.: PCT/JP96/02552

§ 371 Date: Jul. 28, 1998

§ 102(e) Date: Jul. 28, 1998

(87) PCT Pub. No.: WO97/26999

PCT Pub. Date: Jul. 31, 1997

(30) Foreign Application Priority Data

Jan. 22, 1996 (JP) .................................................. 8-008334
Jun. 18, 1996 (JP) .................................................. 8-156699

(51) Int. Cl.$^7$ .................................................. B05D 1/26
(52) U.S. Cl. .............................. 427/8; 427/165; 427/294; 427/356
(58) Field of Search ............................ 427/8, 165, 356, 427/358, 434.3, 294; 118/712, 410, 428

(56) References Cited

U.S. PATENT DOCUMENTS

| 4,696,885 | 9/1987 | Vijan ........................................ 430/311 |
| 5,183,508 | * 2/1993 | Choinski ................................ 118/683 |
| 5,622,747 | * 4/1997 | Todd et al. ............................. 427/96 |
| 5,670,214 | * 9/1997 | Saito et al. ........................... 427/356 |

FOREIGN PATENT DOCUMENTS

| 5-10817 | 5/1985 | (JP) . |
| 7-4566 | 5/1987 | (JP) . |
| 4-61958 | 2/1992 | (JP) . |
| 6-8086 | * 1/1994 | (JP) . |
| 06339655 | 12/1994 | (JP) . |
| 06339656 | 12/1994 | (JP) . |
| 07328513 | 12/1995 | (JP) . |
| 08182953 | 7/1996 | (JP) . |
| 08229497 | 9/1996 | (JP) . |

* cited by examiner

Primary Examiner—Katherine A. Bareford
(74) Attorney, Agent, or Firm—Wenderoth, Lind & Ponack, L.L.P.

(57) ABSTRACT

A substrate is placed on a support surface of a table. The support surface has a flatness of 2 $\mu$m or less. The table has a plurality of holes in the surface. A vacuum is created in the holes to bring the substrate into close contact with the support surface. This eliminates deformations of the substrate, such as twisting and curving. A coating die is moved above the table to apply a coating material onto the substrate. Consequently, a coating having a constant thickness is formed on the substrate.

2 Claims, 8 Drawing Sheets

METHOD OF AND APPARATUS FOR COATING A SUBSTRATE WITH A COATING MATERIAL HAVING AN EVEN THICKNESS

This is a national stage application of PCT/JP96/02552, filed Sep. 6, 1996.

BACKGROUND OF THE INVENTION

1. Field of the Invention

The present invention relates to a method and apparatus for coating a substrate with a coating material by using a coating die and an apparatus for supplying the coating die with the coating material. Particularly, the present invention relates to a method and apparatus for applying the coating material with a constant thickness onto a thin substrate by using the coating die. Further, the present invention relates to an apparatus for supplying the coating material. The present invention is applicable to a coating system having the coating die, but not limited thereto.

2. Description of the Related Art

Both Japanese Patent Laid -Open Publications Tokkaihei 4-61955 and Tokkaihei 1-135565 disclose a method for applying a photo-resist onto a glass plate. Typically, this method is referred to as spin-coating. With this spin-coating, the glass plate is horizontally supported on a rotatable spin chuck. The photo-resist is poured onto an upper central portion of the glass plate. Then, upon rotation of the spin chuck holding the substrate, the poured photo-resist flows outwardly across the entire surface of the glass plate due to a centrifugal force created by the rotation.

The spin coating, however, can only retain a small part of the poured photo-resist (i.e., only about five percent thereof) on the glass plate, and the majority of the photo-resist (i.e., 95 percent thereof) is wasted without being recycled. This waste makes spin-coating significantly expensive.

Japanese Patent Laid-Open Publication Tokkaisho 56-159646 discloses another coating method in which a coating die has a distribution slot for distributing a coating material therefrom. According to this coating method, simply by moving the coating die along a surface of a glass plate, all the photo-resist distributed from the nozzle will be applied onto the surface of the glass plate. This is more economical than spin-coating.

However, most glass plates have three-dimensional deformations (e.g., twisting and curving) and uneven thicknesses. Likewise, a table for supporting the glass plate includes such three-dimensional deformations. A film, having a thickness of only 10 $\mu$m or less, coated by the coating die on the substrate supported by the table will have a striped pattern with thin and thick areas due to gap variations between the coating die and the substrate.

To overcome this problem, Japanese Patent Laid-Open Publication Tokkaihei 7-328513 discloses a method for controlling a coating die. With this method, during coating, gaps (actual gaps) between a nozzle of the coating die and each successive portion of a substrate are pre-measured by a range sensor mounted on the coating die. Using the measured gap values, the coating die is moved towards and away from the substrate in order to keep the actual gap constant.

In this approach, however, two processes are required: one process for measuring the gaps between the nozzle and the substrate; and another process for calculating deviations between the successive gaps (i.e., measurements) and a reference gap predetermined for forming a coating film of specific thickness. Also, these processes must be done simultaneously during coating. However, the latter calculation process requires a considerable amount time, which prevents the calculations from matching the movement of the coating die. Therefore, this approach can only be applied when the coating speed is lower than the calculation speed, and results in an unacceptable delay in coating.

Japanese Patent Laid-Open Publication Tokkaihei 5-185022 discloses another coating method. According to this method, a thickness for each successive portion of a member to be coated (a metal plate) is pre-measured by a sensor at a measurement station at an upstream side of a coating station with respect to a traveling direction of the metal plate. Using the measured values, an applicator (e.g., coating die or blade) is moved towards and away from the metal plate. In this method, however, the measurement station is spaced apart from the coating station. Therefore, if there exists an error or height difference of about several micrometers with respect to a direction perpendicular to a major surface of the metal plate between a first surface portion for supporting the metal plate at the measurement station and the second surface portion for supporting the same at the coating station, it is impossible to measure such a height difference. This in turn prohibits a correction for the height difference between a first surface portion at the measurement station and a second surface portion at the coating station. As a result, a gap between the applicator and the metal plate at the coating station can not be adjusted to a predetermined reference gap even by driving a motor to move the coating device towards and away from the metal plate with an aid of a controller.

A device for supplying the coating die with the coating material has been known. This device has a reservoir for accommodating the coating material and a feed pipe fluidly connected between the reservoir and the coating die. The feed pipe is provided with a pump for feeding the coating material into the coating die and a filter so that the coating material is supplied from the reservoir to the coating die. However, when using a gear pump and a volute pump as the pump, a number of small bubbles, each having a diameter of about 0.01 mm, are invariably mixed into the coating material which is discharged from the pump. The small bubbles hardly affect the thickness of the coated film when the feed pipe has an inner diameter of 5 mm or more.

If, however, the feed pipe has an upwardly curved or bent portion, the small air-bubbles can group together to grow into a relatively large bubble having a diameter of 1 mm or more. The large bubble tends to contract and expand while traveling in the pipe due to changes in pressure from the pump. Then, if the feed pipe has an inner diameter of about 5 mm or less, the resultant contraction and expansion leads a pressure variation in the coating material in the feed pipe. This in turn results in unevenness in the resultant coating. Particularly, this pressure variation will be problematic when a finished thickness of the coating is 10 $\mu$m or less and when a thickness variation of ±5% or less is required for the resultant coating in a wet condition.

SUMMARY OF THE INVENTION

Accordingly, the primary object of the invention is to provide a method and apparatus capable of applying a coating material with a constant thickness to a substrate having three-dimensional deformations (e.g., twisting and curving) and an uneven thickness by using coating die.

Another object of the invention is to provide a device for supplying the coating material by which small bubbles created in the coating material in a pipe are collected at a certain place and then readily discharged.

A method for coating a substrate using a coating die according to the present invention comprises the steps of placing a substrate on a support surface which has a flatness of 2 μm or less and has a plurality of holes, introducing a vacuum into the holes to draw the substrate into close contact with the support surface, and moving the coating die relative to the substrate and applying to the substrate a coating material discharged vertically and downwardly from the coating die.

Preferably, the method further comprises the steps of determining a capillary number based upon a viscosity and a surface tension of the coating material and a moving speed of the coating die relative to the substrate, determining a corresponding non-dimensional minimum coating thickness based upon a relationship between the capillary number and a non-dimensional minimum coating thickness, and determining a gap between the coating die and the substrate according to the corresponding non-dimensional minimum coating thickness. Preferably, the capillary number is 0.1 or less.

An apparatus for coating a substrate using a coating die according to the present invention comprises a support surface having a flatness of 2 μm or less and a plurality of holes defined therein, a mechanism for introducing a vacuum into the holes to draw substrate placed on the support surface into close contact with the support surface, a coating die having a slot nozzle directed vertically and downwardly toward the substrate for discharging the coating material, a mechanism for moving the coating die relative to the support surface, a mechanism for supplying the coating material with the coating die, and a mechanism for controlling a gap between the coating die and the substrate.

Another method for coating a substrate using a coating die according to the present invention comprises the steps of pre-measuring actual gaps in an entire coating area between successive portions of the surface of the substrate to be coated and the coating die spaced apart from the substrate, calculating deviations between the pre-measured actual gaps and a reference gap, and then moving the coating die for applying the coating material while the actual gap between the coating die and the substrate is adjusted.

Further, another apparatus for coating a substrate using a coating die according to the present invention comprises a support surface for supporting the substrate horizontally, a coating die having a slot nozzle directed vertically and downwardly toward the substrate for discharging a coating material, a mechanism for measuring an actual gap in an entire coating area between the substrate supported on the support surface and the coating die, a mechanism for calculating a deviation between the actual gap and a predetermined reference gap, a mechanism for moving the coating die relative to the support surface, a mechanism for supplying the coating material to the coating die, and a mechanism for adjusting the actual gap between the coating die and the substrate based upon the deviation at coating.

Preferably, the support surface has a flatness of 2 μm or less and a plurality of holes defined therein, and the apparatus further comprises a mechanism for introducing a vacuum into the holes to draw the substrate into close contact with the support surface.

In another aspect of the present invention, an apparatus for supplying a coating material to a coating die in which a tank for accommodating the coating material is connected through a pipe with the coating die, the pipe having a pump for feeding the coating material from the tank to the coating die comprises a deaerator which is arranged in the pipe for collecting bubbles in the coating material and discharging the same from an openable exit (exhaust) defined in an upper portion thereof.

BRIEF DESCRIPTION OF THE DRAWINGS

These and other objects and features of the present invention will become clear from the following description taken in conjunction with the preferred embodiments thereof with reference to the accompanying drawings throughout which like parts are designed by like reference numerals, and in which.

DESCRIPTION OF THE PREFERRED EMBODIMENTS (1) First Embodiment

Figure 1:
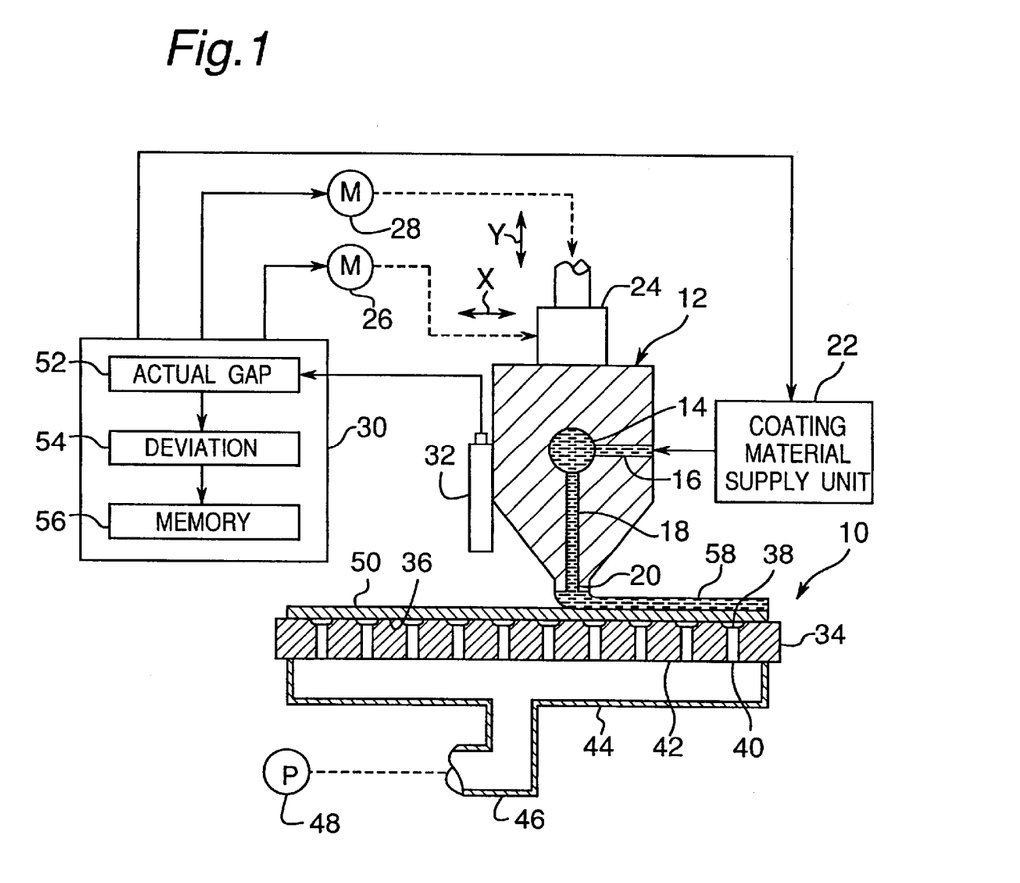
FIG. 1 shows a sectional view of a coating system of the invention and an electric circuit thereof.

FIG. 1 depicts a coating system 10 having a coating die 12 according to the present invention. The coating system 10 includes the coating die 12. The coating die 12 includes therein a manifold 14 extending lengthwise, one or more through-holes 16 for supplying coating material (for example, photo-resist) into the manifold 14, and a slot nozzle 18 formed along the manifold 14 for discharging the photo-resist therefrom. This coating die 12 is arranged so that an outlet 20 of the slot nozzle 18 is directed downwards vertically. The through-hole 16 is fluidly connected with a coating material supply unit 22 so that the photo-resist accommodated in the unit 22 is fed via the through hole 16 and manifold 14 to the slot nozzle 18, and is finally discharged from the outlet 20.

The coating die 12 is secured on a support 24. The support 24 is drivingly coupled to both a horizontal drive mechanism 26 for moving the coating die 12 in a horizontal direction indicated by the arrow X which is perpendicular to the slot nozzle 18 and a vertical drive mechanism 28 for moving the same in a vertical direction indicated by the arrow Y. These mechanisms 26 and 28 are electronically connected to a calculation mechanism 30 so that they are independently energized in accordance with outputs from the calculation mechanism 30. The vertical drive mechanism 28 comprises a servo motor and a mechanism having a lead screw and an associated screw member engaged therewith through a backlash-less thread (threads having less backlash). The backlash-less threads enable the vertical drive mechanism 28 to move the coating die 12 up and down with great precision in the order of microns. Further, the coating die 12 carries a non-contact range sensor 32 for measuring a gap therefrom to an object to be placed therebelow. The measurement of the sensor 32 is fed into the calculation mechanism 30.

A table is positioned horizontally below the coating die 12 for supporting a glass plate 50 to be coated. A support surface 36 of the table 34 is machined to have a flatness of 2 μm or less. The support surface 36 includes therein a plurality of grooves 38 arranged in a lattice, and the table 34 includes a number of through-holes 40 extending from the groves 38 to a bottom surface 42 thereof. The bottom surface 42 of the table 34 is covered with a hood 44 so that the hood 44 encloses therein the holes 40. The hood 44 is fluidly connected to a vacuum pump 48 via an exhaust tube 46. Therefore, placing the glass plate 50 on the surface 36 and then energizing the vacuum pump 48 will introduce a vacuum into the hood 44, through-holes 40 and groves 38. This vacuum draws the glass plate 50 into close contact with the table 34, and this close contact eliminates deformations in the glass plate 50 such as twisting and curving.

The calculation mechanism 30 includes an actual gap calculating unit 52, a deviation calculating unit 54 and memory unit 56. The actual gap calculating unit 52 determines, from the measurement of the range sensor 32, a gap (actual gap) between the outlet 20 and an underlying reference surface. The reference surface is at a position where an upper surface of an ideal glass plate having no deformations such as curving or unevenness in thickness would be positioned. The deviation calculating unit 54 calculates a deviation between the actual gap and the reference gap. The reference gap is determined in a manner described below. The memory unit 56 stores the calculated values as required. Also, the calculation mechanism 30 vertically controls the coating die 12 by driving the vertical drive mechanism 28 so that the deviation is eliminated in order to adjust the actual gap to the reference gap.

Incidentally, the reference surface of the ideal glass plate is an imaginary surface and therefore the reference gap cannot be measured. For this reason, practically the actual gap (i.e., pseudo actual-gap) is determined by measuring a gap between the support surface 36 and the outlet 20 and then subtracting a thickness of the ideal glass plate 50 from the previously measured gap.

In operation, the glass plate 50 is positioned on the table 34. This plate 50 is sized so that it entirely covers the grooves 38 formed in the support surface 36 of the table 34. Then the vacuum pump 48 is energized. This introduces a vacuum into the hood 44 and the vacuum draws the glass plate 50 into close contact with the support surface 36 of the table 34. Thus, the deformations of the glass plate 50 such as twisting and curving are eliminated. Next, the range sensor 32 measures the gap between the support surface 36 and the outlet 20. Then the actual gap between the outlet 20 and the reference surface is calculated. The calculation mechanism 30 determines a deviation between the actual gap and the reference gap (determination of the reference gap will be discussed below). Also, the calculation mechanism 30 activates the vertical drive mechanism 28 to adjust the actual gap between the outlet 20 and the glass plate 50 to the reference gap. Subsequently, while maintaining the reference gap, the photo-resist 58 is supplied to the manifold 14 from the coating supply unit 22 and the coating die 12 is moved by the horizontal drive mechanism 26 in the direction indicated by an arrow X (perpendicular to the slot nozzle 18). The glass plate 50 is applied with the photo-resist 58 discharged from the outlet 20 through the slot nozzle 18.

The reference gap will be discussed below. The reference gap is determined by using a relationship (see FIG. 2) between a capillary number obtained from an experiment performed by Lee et al. and a non-dimensional minimum coating thickness, and following equations (1) and (2). The experiment made by Lee et al. is fully described in Chemical Engineering Science, vol. 47, No. 7, pages 1, 703 to 1, 713 in 1992. The inventors, Yokoyama et al., of the present invention, verified the experimental results by numerical analysis. Consequently, the results of the analysis were found to be almost identical to those of the experiments, as shown in FIG. 2.

Figure 2:
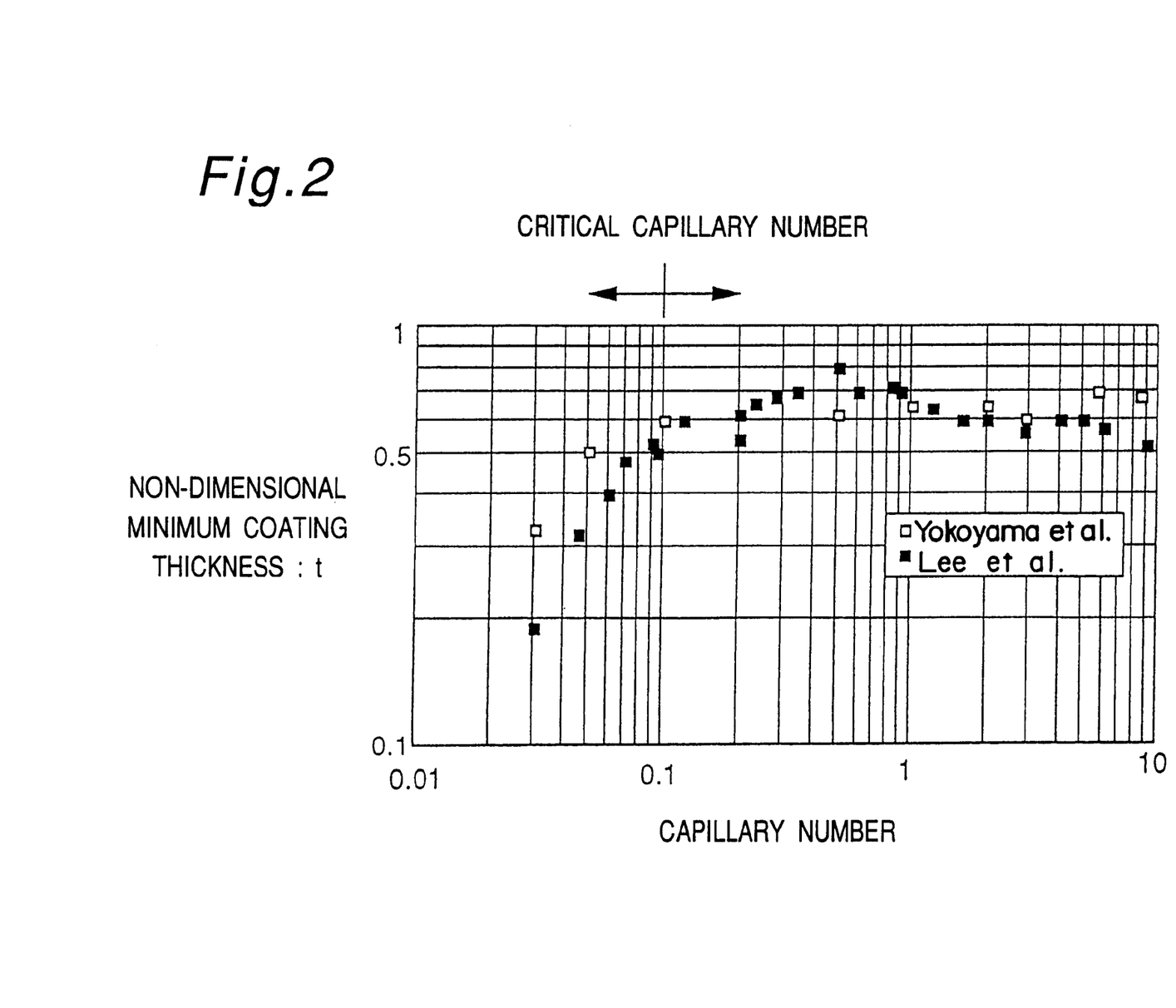
FIG. 2 is a graph showing a relationship between a capillary number and a non-dimensional minimum coating thickness.

In a graph shown in FIG. 2, the capillary number Ca is substantially proportional to the non-dimensional minimum coating thickness t (a ratio between the capillary number and the non-dimensional coating thickness) if the capillary number Ca is less than a critical capillary number of 0.1. Therefore, in the condition that the capillary number Ca is within this proportional area, a coating having a thickness which corresponds to the reference gap can be obtained by adjusting the reference gap to a certain value which exists between maximum and minimum gaps.

The maximum gap is calculated by calculating the capillary number obtained by substituting values representing properties of the coating material and coating speed (moving speed) into the equation (1), then determining a corresponding non-dimensional minimum coating thickness from the above calculated capillary number with reference to the graph in FIG. 2, and finally substituting the above determined corresponding non-dimensional minimum coating thickness into the equation (2). The minimum gap, on the other hand, is calculated by determining the corresponding non-dimensional minimum coating thickness from the threshold capillary number 0.1 with reference to FIG. 2, and then substituting the above determined corresponding non-dimensional minimum coating thickness into the equation (2).

$$Ca = \mu \cdot U / \sigma \quad (1)$$

$$t = h / H \quad (2)$$

wherein

Ca: Capillary number,

μ: Viscosity of coating material (Pa·S),

U: Coating speed (m/s).

σ: Surface tension (N/m), t: Non-dimensional minimum coating thickness, h: Minimum thickness of coating material (target coating thickness) (μm), and H: Gap from outlet to plate (μm).

Note that the maximum and minimum gaps are an upper limit gap and a lower limit gap, respectively, at which a stable and continuous meniscus of the coating material between the outlet and the plate can be kept. Therefore, if the gap is larger than the maximum gap or smaller than the minimum gap, no stable meniscus will be formed. On the other hand, if the gap ranges between the maximum and minimum gaps, the surface tension of the coating material in the gap serves as a shock absorber. The surface tension compensates for the variations of the gap caused by the unevenness of the plate, and thereby ensures the coating die forms a coating with a desired (target) thickness on the plate.

The determination of the maximum and the minimum gaps will be discussed below. Assume that the photo-resist 58 has a viscosity ($\mu$) of 0.06 Pa·s, a surface tension ($\sigma$) of $30 \times 10^{-3}$ N/m, and the glass plate 50 is 650 mm long, 550 mm wide, and 1.1 mm±10 $\mu$m thick. Also, it is assumed that a coating speed is 10 mm/s and a target thickness of the coating is 10 $\mu$m. In this case, by substituting the viscosity ($\mu$) of 0.06 Pa·S of the photo-resist 58, coating speed (U) of 10 mm/s, and surface tension ($\sigma$) of $30 \times 10^{-3}$ N/m into the equation (1), the capillary number (Ca) of 0.02 is determined. Then, according to the graph in FIG. 2, by using the calculated capillary number (i.e., 0.02), the corresponding non-dimensional minimum coating thickness (t) of 0.15 is determined. Finally, by substituting the corresponding non-dimensional minimum coating thickness t of 0.15 and the target coating thickness of 10 $\mu$m into the equation (2), the maximum gap of 66 $\mu$m is determined.

The reference gap will be minimized if the capillary number (Ca) is approximately at the critical capillary number of 0.1. Therefore, from the graph in FIG. 2, the corresponding non-dimensional minimum coating thickness corresponding to the capillary number of 0.1 is determined to be about 0.6. Then, by using the target coating thickness of 10 $\mu$m, the minimum gap of about 16 $\mu$m is determined by the equation (2).

Consequently, if the gap from the outlet 20 to the glass plate 50 ranges between the minimum gap (i.e., 16 $\mu$m) and the maximum gap (i.e., 66 $\mu$m), the coating die 12 will form a coating with a thickness of 10 $\mu$m on the glass plate 50 in spite of the gap variation due to the unevenness of the glass plate 50.

The curving of the plate 50 is substantially eliminated by drawing it onto the support surface 36 of the table 34. The plate 50, however, still includes the unevenness in thickness of ±10.0 $\mu$m. Therefore, the upper surface of the plate 50 possibly includes a height error of ±11.0 $\mu$m against the reference surface (the table 34 has a flatness of 2 $\mu$m or less).

However, the gap between the outlet 20 of the coating die 12 and the glass plate 50 can be adjusted from 16 $\mu$m to 66 $\mu$m. Therefore, in case that the actual gap is set to 55 $\mu$m, even if the gap variation is increased to the maximum and thereby the outlet 20 takes a position that is farthest from the glass plate 50, the actual gap is still equal to or less than the maximum value of 66 $\mu$m (=55 $\mu$m) +11 $\mu$m). Even when the gap variation is decreased to the minimum and thereby the outlet 20 takes a position closest to the glass plate, the actual gap is 44 $\mu$m (=55 $\mu$m–11 $\mu$m). Also if the gap is 44 $\mu$m, there still exists a clearance of 34 $\mu$m (=44 $\mu$m–10 $\mu$m) between the surface of the coating having a thickness of 10 $\mu$m and the outlet 20. This clearance ensures that a sufficient space is interposed between the outlet 20 of the coating die 12 and the glass plate 50. Further, increasing the reference gap will minimize the adverse effect due to the unevenness in the surface of the substrate.

It should be understood that the range sensor 32 is not limited to the non-contact type sensor and a contact-type sensor can also be utilized instead. Also, although in the previous vacuum mechanism the hood 44 covers the entire bottom surface 42 of the table 34, each of the through holes 40 in the table 34 may be connected directly through an associated branch tube with the exhaust tube 46 for drawing the glass plate 50 into close contact with the table 34.

As described above, according to this embodiment, the glass plate is supported on the table having a flatness of 2.0 $\mu$m or less and it is drawn closely to the table, which eliminates the twisting and curving of the glass plate. Eventually, the gap between the outlet of the coating die and the upper surface of the substrate includes a small error consisting exclusively of the unevenness in the thickness of the glass plate and the unevenness of the table (i.e., 2.0 $\mu$m or less). This small error is canceled by the surface tension of the meniscus formed between the outlet of the coating die and the glass plate. This ensures that a film applied to the glass plate will have a certain thickness.

Further, by setting the capillary number to 0.1 or less, a coating having a desired thickness can be applied onto the glass plate while the gap from the coating die to the glass plate is as large as possible.

(2) Second Embodiment

Although the gap between the outlet of the coating die to the glass plate is fixed from the beginning to the completion of the coating die in the previous embodiment, the gap may be changed according to the unevenness of the glass plate so as to adjust the gap between the outlet and the glass plate to the reference gap.

Figure 3A:
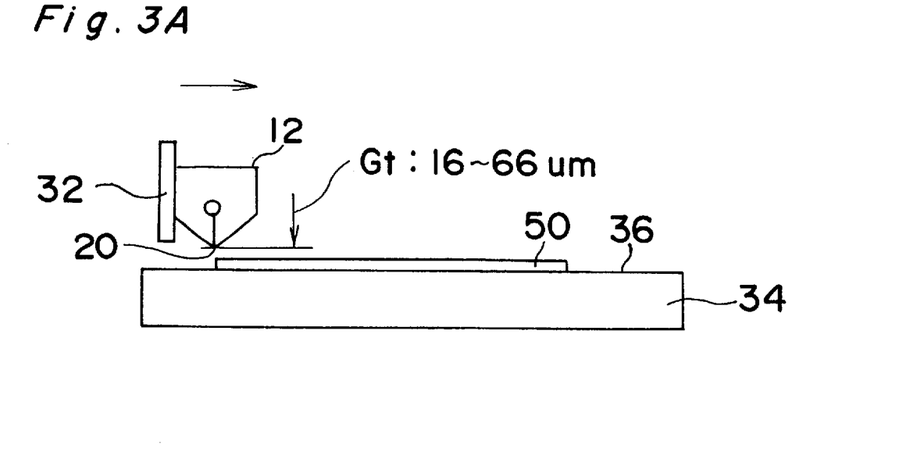
FIGS. 3A, 3B, and 3C show a process for applying a coating material onto a substrate by using a coating die according to the invention.
Figure 3B:
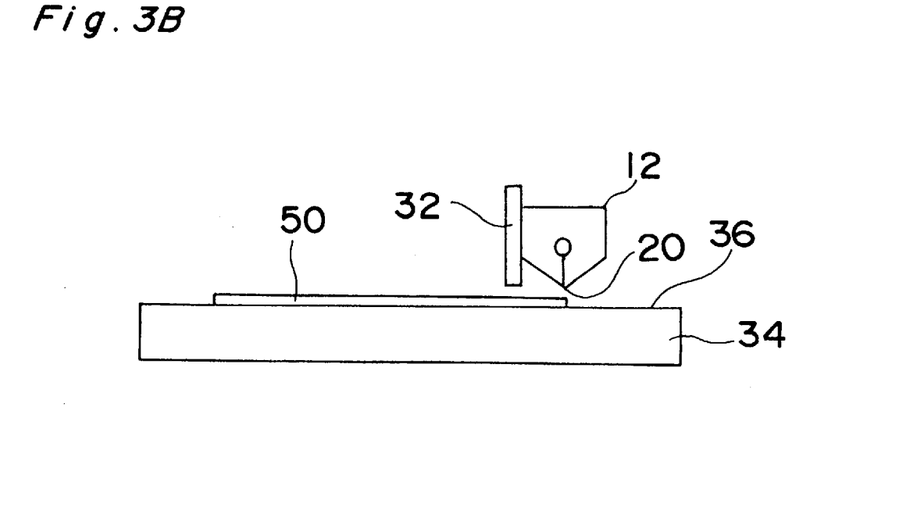

This application method will be discussed with reference to FIGS. 3A to 3C and FIG. 4. In this method, the vacuum pump 48 is energized to draw the glass plate 50 located on the table 34 to the support surface 36 of the table 34, and thereby eliminates the deformations such as twisting and curving. Next as shown in FIG. 3A, the gap from the outlet 20 to the glass plate 50 is adjusted to a specified reference gap Gt (level) that is at a specific value within a range from 16 to 66 $\mu$m. Then as shown in FIG. 3B, the non-contact range sensor 32 is moved by the horizontal drive mechanism 26 to pre-scan the entire surface of the glass plate 50 and is used to determine the actual gaps Ga at certain intervals along the glass plate 50. Also, based upon the values measured by the sensor 32, the actual gap calculating unit 52 in the calculating mechanism 30 determines the actual gaps Ga (i), Ga (i+1), Ga (i+2), . . . between the outlet 20 and each portion of the plate (these values area not pseudo actual gaps). The actual gap is measured against the glass plate 50. Further, the deviation calculating unit 54 calculates deviations D (i), D (i+1), D (i+2), . . . between the reference gap Gt and the corresponding actual gaps Ga (i), Ga (i+1), Ga (i+2), . . . . The calculated deviations are stored in the memory unit 56. In this calculation, consideration is made to a relationship between the coating speed (i.e., moving speed of the coating die) and the vertical speed of the coating die 12 (i.e., a time delay of the vertical movement with respect to the horizontal movement). Also, the measurement of the actual gap is performed against the glass plate 50 onto which the coating material is applied, and therefore it is not necessary to compensate for the differences between the levels of the measuring position and the coating position, which would otherwise occur if the two positions are space apart from each other.

Figure 3C:
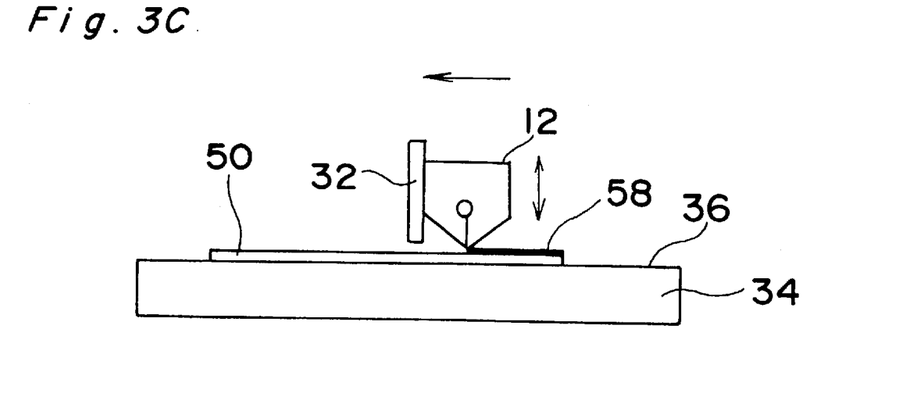
Figure 4:
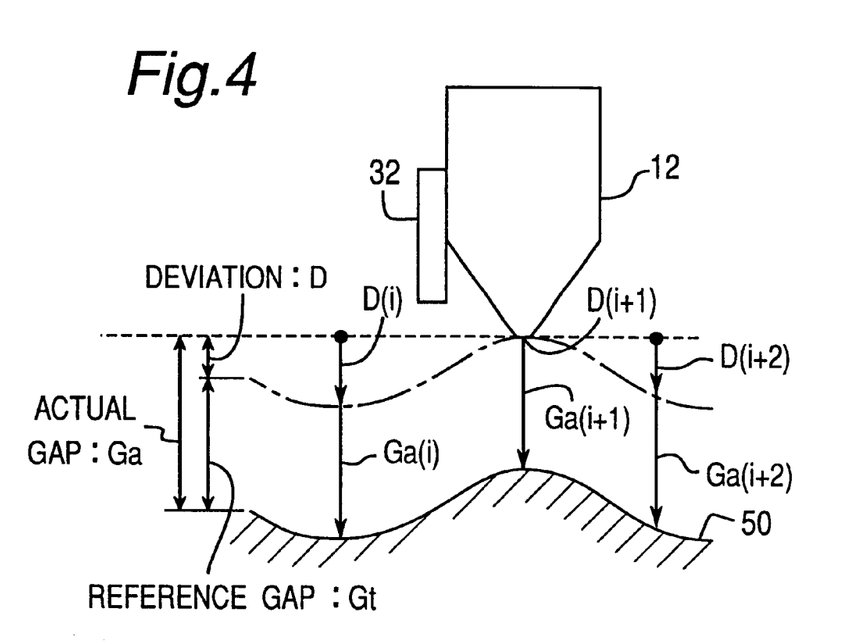
FIG. 4 shows a relationship between a reference gap, actual gaps, and deviations.

After the calculations have been completed, as shown in FIG. 3C, the coating die 12 is moved horizontally and the photo-resist 58 is fed from the coating material supply unit 22 into the coating die 12. At this stage, as described before, the coating die 12 is moved up and down by the vertical drive mechanism 28 according to the deviations D calculated by taking both the coating and elevation speeds into account. This ensures that the actual gap from the outlet 20 to the surface of glass plate 50 is always kept constant and thereby a coating having a constant thickness is applied onto the glass plate 50.

As described, prior to the coating, the deviations D between the reference gap Gt and the actual gaps Ga have been calculated. Also, the deviations are determined by taking the elevation (vertical) and moving (horizontal) speeds of the coating die 12 into account. Therefore, the entire surface of the glass plate 50 can readily be applied with the coating that has a constant thickness. If the actual gap Ga is measured by the non-contact range sensor 32, the speed of the coating die 13 may be lower during measurements than that of the coating speed (during coating) to increase the precision of the measurements.

According to the coating method using coating die, the calculation is carried out in the calculation mechanism 30 by taking the coating speed and the elevation speed of the outlet 20 into account, and therefore the actual gap between the surface of the glass plate 50 and the outlet 20 of the coating die 12 can always be kept at the reference gap without depending upon the coating speed. Incidentally, when the coating is accelerated due to an increase in productivity, a range between the maximum and minimum reference gaps will become narrower. In the coating method in the first embodiment in which the gap from the coating die to the table is fixed, a large deviation between the actual gap and the reference gap may result. This makes it difficult to form a coating with a constant thickness. In the method according to this embodiment, the actual gap can always be adjusted to the reference gap. According to this method, because the relationship between the elevation speed of the coating die 12 (outlet 20) and the coating speed is considered (i.e., time delay), the coating speed can be changed freely.

Also, this invention may be used with a rigid plate rather than a flexible one. In this case, it is not necessary to draw the plate onto the table 34.

Further, although the described coating die 12 has only one vertical driving mechanism 28 and one range sensor 32, it may have two of each. In this case, the vertical driving mechanisms 28 are arranged at opposite sides (ends) of the coating die 12, and the range sensors 32 are positioned adjacent to the opposite sides (ends) of the coating die 12 so that each of which can cooperate with the associated the vertical driving mechanism 28. With two pairs of range sensors 32 and the vertical associated driving mechanisms 28, the thickness variations of the glass plate on opposite sides can be considered during application of the coating.

Furthermore, it is not necessary to calculate the reference gap between the coating die and the glass plate using the capillary number Ca as described in the previous embodiment. Alternatively, the reference gap may be determined through experimentation (regardless of the capillary number). Even in this case, the glass plate should be drawn onto the table to eliminate the twisting and curving of the glass plate.

As can be seen from the above description, it is not necessary to simultaneously carry out the measurement, calculation and elevation of the outlet, and therefore the coating die can be moved up and down to keep the reference gap even if the coating speed is relatively high. This ensures that the gap between the plate surface and the outlet is at the reference gap regardless of the coating speed, even if the substrate has deformations (for example, twisting, curving and unevenness in thickness). As a result, even when the coating has a relatively thin thickness of 10 μm or less and extremely precise coating is required in which the accuracy of the thickness should be less than ±5%, the desired coating can still be formed.

Further, the non-contact type range sensor is integrally mounted on the coating die. This permits the measurement to be made at the coating position, and allows for a precise measurement of the actual gap.

Furthermore, the flexible plate can be drawn onto the flat table by the suction mechanism in order to remove its twisting and curving. This ensures that the coating is applied to a desired thickness.

(3) Coating Material Supply Unit

Figure 5:
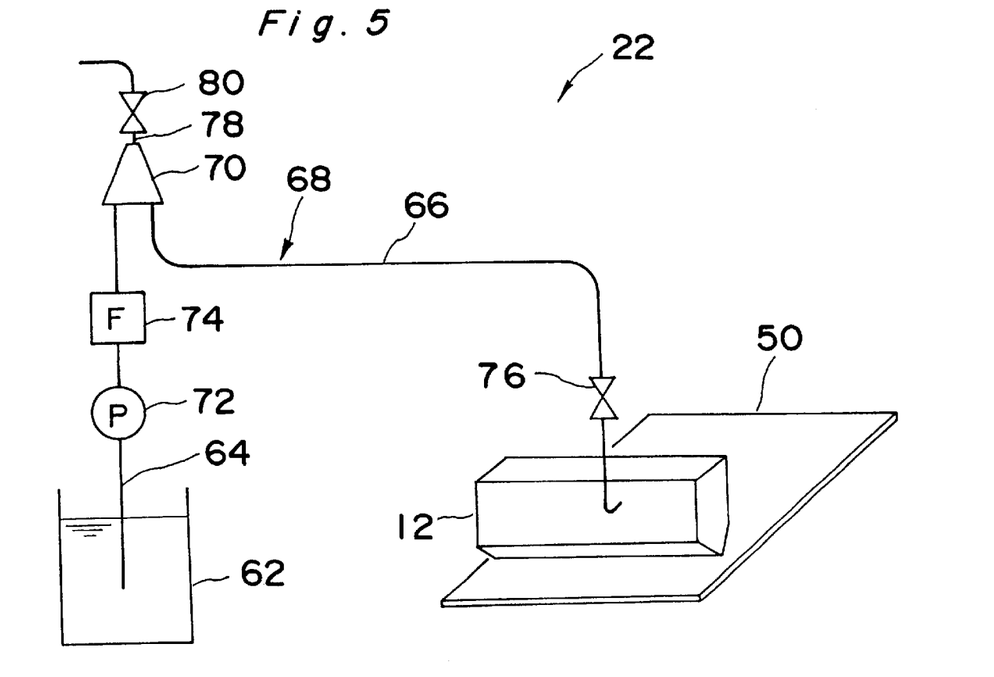
FIG. 5 shows a general construction of a coating material supply unit used in the coating system shown in FIG. 1.

As shown in FIG. 5, the coating material supply unit 22 has a tank 62 for accommodating the coating material. The tank 62 is connected to the coating die 12 by a pipe 68 having a first pipe 64 and a second pipe 66. The first and second pipes 64 and 66 are connected to each other through a deaerator 70. The first pipe 64 has a pump 72 and a filter 74. The pump 72 is positioned on a side adjacent to the tank 62, and the filter 74 is positioned on the other side thereof. Further, the second pipe 66 has a valve 76 adjacent to the coating die 12.

Figure 6:
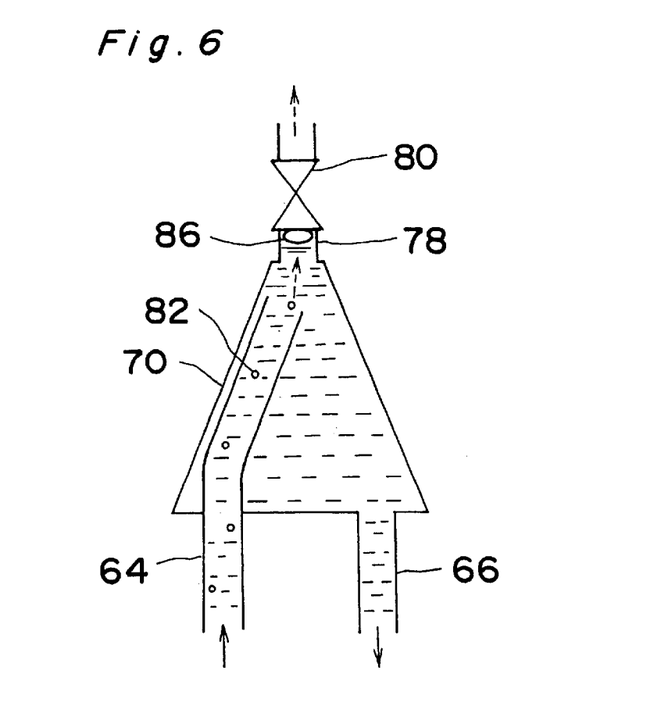
FIG. 6 is a sectional view of a deaerator employed in the coating material supply unit.

As shown in FIG. 6, the deaerator 70 is generally in the form of cone, and has at its top portion an outlet 78 for discharging air. The outlet 78 is connected through a valve 80 to the atmosphere. The valve 80 may be controlled manually or electrically. To decrease an adverse effect of pressure variation in the deaerator 70 the deaerator 70 has a significantly larger volume than a large air bubble that can be formed therein. The pressure variation is caused by contractions and expansions of the large air bubble 86 collected adjacent to the outlet 78. The deaerator 70 is designed to have a volume that can receive a large amount of coating material as compared to the volume of the large bubble 86 possibly formed therein. In addition, the first pipe 64 extends into the interior of the deaerator 70 and then terminates near the top of deaerator 70. On the other hand, the second pipe 66 is connected to the bottom of deaerator 70. This pipe arrangement ensures that small bubbles 82 can be collected in the outlet 78 and further no coating material with the small bubbles is discharges into the second pipe 66.

Preferably, where the pipe 68 between the pump 72 and the coating die 12 includes a bent portion and extends upward from the pump, or where the pipe 68 connected with the pump 72 extends horizontally and then curves upward, the deaerator 70 is positioned at or adjacent to a next bent portion which extends in the horizontal or in a downward direction. However, if the pipe 68 extends horizontally from the pump and then curves downward, the deaerator 70 is preferably positioned at or adjacent to the bent portion. This is because the bubbles tend to collect in the vicinity of the bent portions.

The pump 72 and the coating die 12 can be arranged in three ways. The pump 72 may be positioned at the same level as the coating die 12. Further, it may be positioned higher or lower than the coating die 12.

Figure 8A:
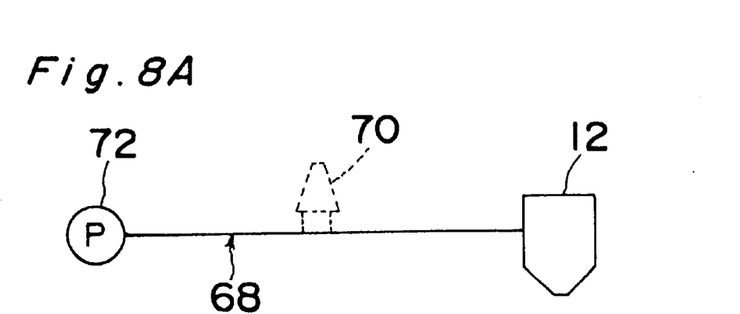
FIGS. 8A and 8B show arrangements of the deaerator in the coating material supply unit in which a pump and the deaerator are disposed at the same level.
Figure 8B:
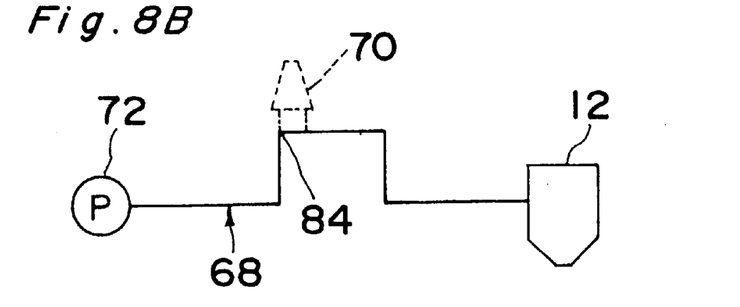
Figures 9A, 9B:
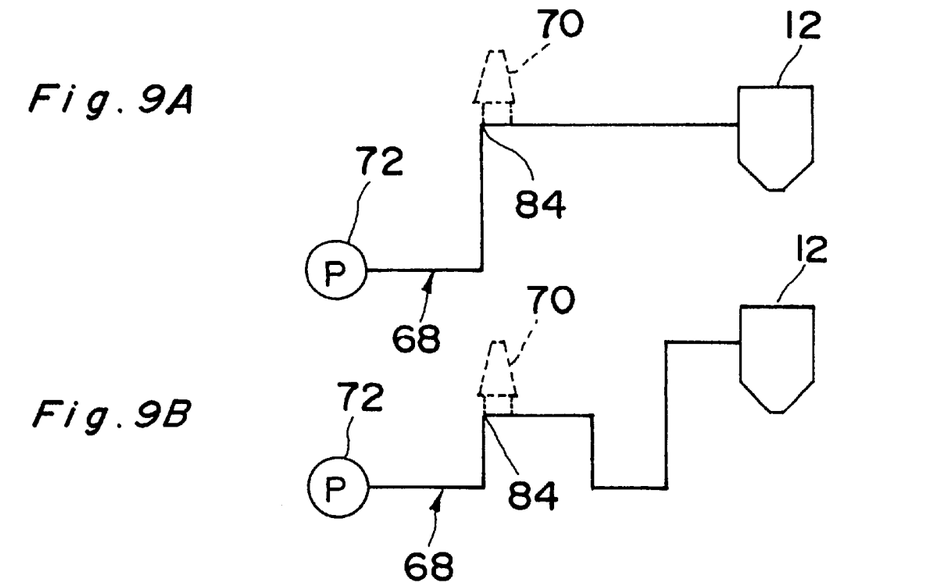
FIGS. 9A, 9B, and 9C show other arrangements of the deaerator in the coating material supply unit in which the coating die is located higher than the pump.
Figure 9C:
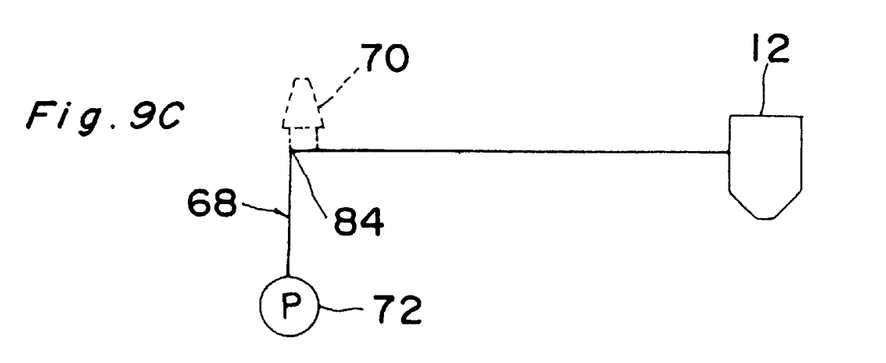

If the pump 72 and the coating die 12 are arranged at the same level as shown in FIG. 8A, in which the pump 72 is connected to the coating die 12 through a straight pipe 68 extending horizontally, the deaerator 70 may be disposed at any position along the pipe 68. If the pump 72 and the coating die 12 are connected through the pipe 68 that includes a plurality of bent portions (to avoid obstacles as shown in FIG. 8B), the deaerator 70 is arranged at or adjacent to a first bent portion 84 where a first vertical pipe portion adjacent the pump 72 is connected at its uppermost portion with a subsequent horizontal pipe portion. Likewise, if the coating die 12 is located higher than the pump 72, as shown in FIGS. 9A to 9C, the deaerator 70 is preferably arranged at or adjacent to the bent portion 84.

Figures 10A, 10B:
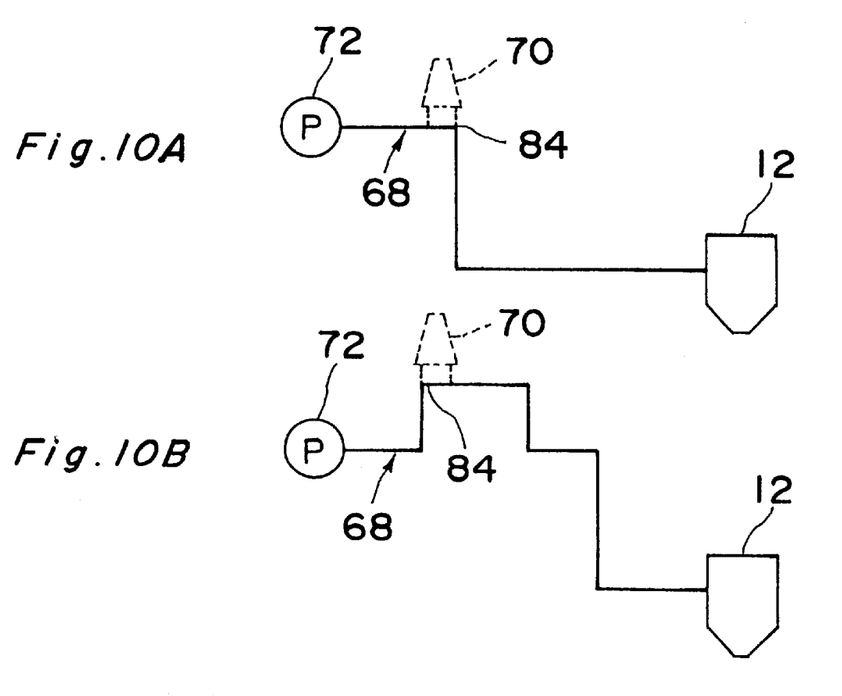
FIGS. 10A and 10B show other arrangements of the deaerator in the coating material supply unit in which the coating die is located lower than the pump.

As shown in FIG. 10A, if the coating die 12 is located at a position lower than the pump 72, the deaerator 70 is preferably arranged at the first bent portion 84 where the pipe 68 extends horizontally then turns downward. If, however, the pipe 68 includes an upwardly bent portion to avoid obstacles as shown in FIG. 10B, the deaerator 70 is preferably arranged at or adjacent to the first bent portion 84 where the pipe 68 upwardly extends and then horizontally extends.

During operation of the coating material supply unit 22 for the coating die 12 thus constructed, the valve 76 is opened and the other valve 80 is closed, and then the pump 72 is energized. The first and second pipes 64 and 66, and the deaerator 70 are filled with the coating material to prepare for the coating. At this stage, the valve 80 is opened for a while to exhaust the air collected in the outlet 78 in the deaerator 70.

Subsequently, the pump 72 feeds the coating material continuously into the coating die 12. The coating material, flowing from the pump 72 through the filter 74 into the deaerator 70, can contain small bubbles 82 as shown in FIG. 6. When the small bubbles 82 enter the deaerator 70, the small bubbles 82 move upward due to their buoyancy and grow into the large bubble 86 at the outlet 78 as shown in FIG. 6. The large bubble 86 is forced out through the outlet 78 due to the pressure of the coating material during periodic openings of the valve 80. The coating material from which the most bubbles 82 have been removed is then fed into the second pipe 66 by the pressure applied from the pump 72. At this time, the volume of the deaerator 70 is relatively large. This decreases the contractions and expansions of the coating material is fed from the first pipe 64. This ensures that the coating material is fed out at a constant pressure. Then, the coating material is supplied to the coating die 12, and it is applied onto the glass plate 50.

Although the substrate is a plate, as in the previous embodiments, it may be a continuous strip-like member. Also, the deaerator 70 is not limited to the conical configuration, and the deaerator 70 may have other configurations that include a small area portion at its top adjacent to the outlet 78 to collect small bubbles 82 in the coating material.

Figure 7:
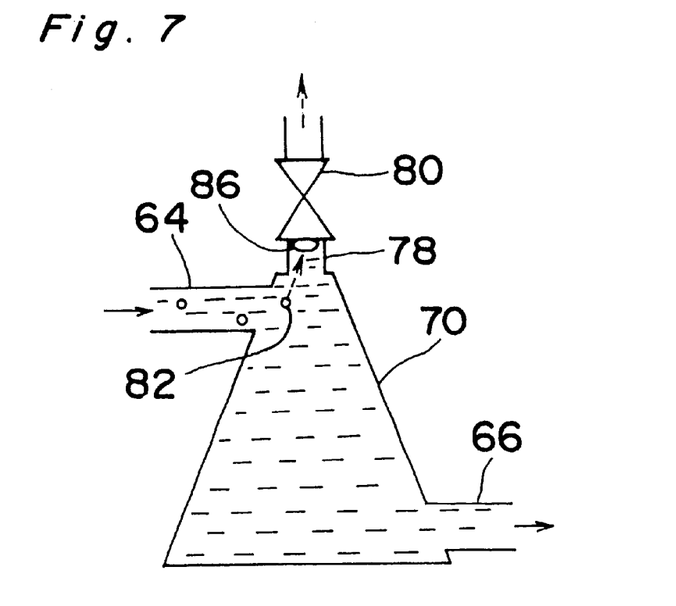
FIG. 7 shows a modified embodiment of the deaerator.

Further, any pipe arrangement for the deaerator 70 can be utilized which enables the small bubbles 82 to be collected at the deaerator 70. For example, as shown in FIG. 7, the first and second pipes 64 and 66 may be connected with an upper side portion and lower side portion of the deaerator 70, respectively.

As described above, the bubbles in the coating material are collected by the deaerator and then removed out of the coating material supply circuit. Also, the volume of the collected air is small enough as compared with that of the deaerator so that no substantial pressure vibration is generated in the coating material regardless of the pressure generated for supplying the coating material. This ensures the coating material to be fed into the manifold in the coating die is at a constant pressure. The constant pressure allows the plate to be coated with a coating that has constant thickness.

While there is shown and described herein certain specific structures embodying the invention, it will be known to those skilled in the art that various modifications and rearrangements of the parts may be made without departing from the spirit and scope of the underlying inventive concept. Further, the invention is not limited to the particular forms herein shown and described except insofar as indicated by the scope of the appended claims.

What is claimed is:

1. A method of coating, comprising:
   placing a substrate onto a support surface having a flatness of 2 µm or less, and wherein said support surface has a plurality of holes;
   introducing a vacuum into said holes to attract said substrate into close contact with said support surface in order to eliminate deformations of said substrate;
   determining a capillary number as a function of a viscosity of a coating material, a surface tension of said coating material, and a coating speed of a coating die relative to said substrate by the equation:

$$Ca=\mu U/s,$$

wherein Ca=said capillary number, $\mu$=said viscosity (Pa·S), U=said coating speed (m/s), and s=said surface tension (N/m), and
   wherein said determining said capillary number includes selecting said capillary number to be 0.1 or less;
   determining a corresponding non-dimensional minimum coating thickness as a function of said capillary number;
   determining a reference gap between said coating die and said substrate as a function of said corresponding non-dimensional coating thickness and a target thickness of said coating material by the equation:

$$H=h/t,$$

wherein H=said reference gap, h=said target thickness of said coating material, and t=said corresponding non-dimensional coating thickness;
   moving horizontally said coating die relative to said substrate;
   maintaining said reference gap between said coating die and a reference surface of said substrate; and
   applying said coating material onto said substrate by downwardly discharging said coating material from said coating die.

2. A method of coating, comprising:
   placing a substrate onto a support surface having a flatness of 2 µm or less, and wherein said support surface has a plurality of holes;
   introducing a vacuum into said holes to attract said substrate into close contact with said support surface in order to eliminate deformations of said substrate;
   determining a capillary number as a function of a viscosity of a coating material, a surface tension of said coating material, and a coating speed of a coating die relative to said substrate by the equation:

$$Ca=\mu U/s,$$

wherein Ca=said capillary number, $\mu$=said viscosity (Pa·S), U=said coating speed (m/s), and s=said surface tension (N/m), and
   wherein determining said capillary number includes selecting said capillary number to be 0.1 or less;
   determining a corresponding non-dimensional minimum coating thickness as a function of said capillary number;
   determining a reference gap between said coating die and said substrate as a function of said corresponding non-dimensional coating thickness and a target thickness of said coating material by the equation:

$$H=h/t,$$

wherein H=said reference gap, h=said target thickness of said coating material, and t=said corresponding non-dimensional coating thickness;

pre-measuring actual gaps, over an entire coating area of said substrate between successive portions of a surface of said substrate and a coating die spaced apart from said substrate after said introducing said vacuum into said holes prior to a coating of said substrate;

calculating deviations between each of said pre-measured actual gaps and a reference gap;

moving horizontally said coating die relative to said substrate after said calculating operation;

adjusting an actual gap between said coating die and said surface of said substrate to said reference gap by vertically moving said coating die based upon said calculated deviations; and applying said coating material onto said substrate surface of said substrate, as pre-measured, during said horizontal moving and adjusting operations.

* * * * *

UNITED STATES PATENT AND TRADEMARK OFFICE
CERTIFICATE OF CORRECTION

PATENT NO. : 6,309,692 B1
DATED : October 30, 2001
INVENTOR(S) : Masahiro Nakamura et al.

It is certified that error appears in the above-identified patent and that said Letters Patent is hereby corrected as shown below:

<u>Title page,</u>
Item [86], change "§371 Date: Jul. 28, 1998" to -- §371 Date: Jul. 22, 1998 --.
Item [86], change "§102(e) Date: Jul. 28, 1998" to -- §102(e) Date: Jul. 22, 1998 --.

Signed and Sealed this

Ninth Day of April, 2002

Attest:

JAMES E. ROGAN
Attesting Officer     Director of the United States Patent and Trademark Office